June 14, 1955 G. LERCH 2,710,697
HAY LOADER
Filed Sept. 2, 1953 2 Sheets-Sheet 1
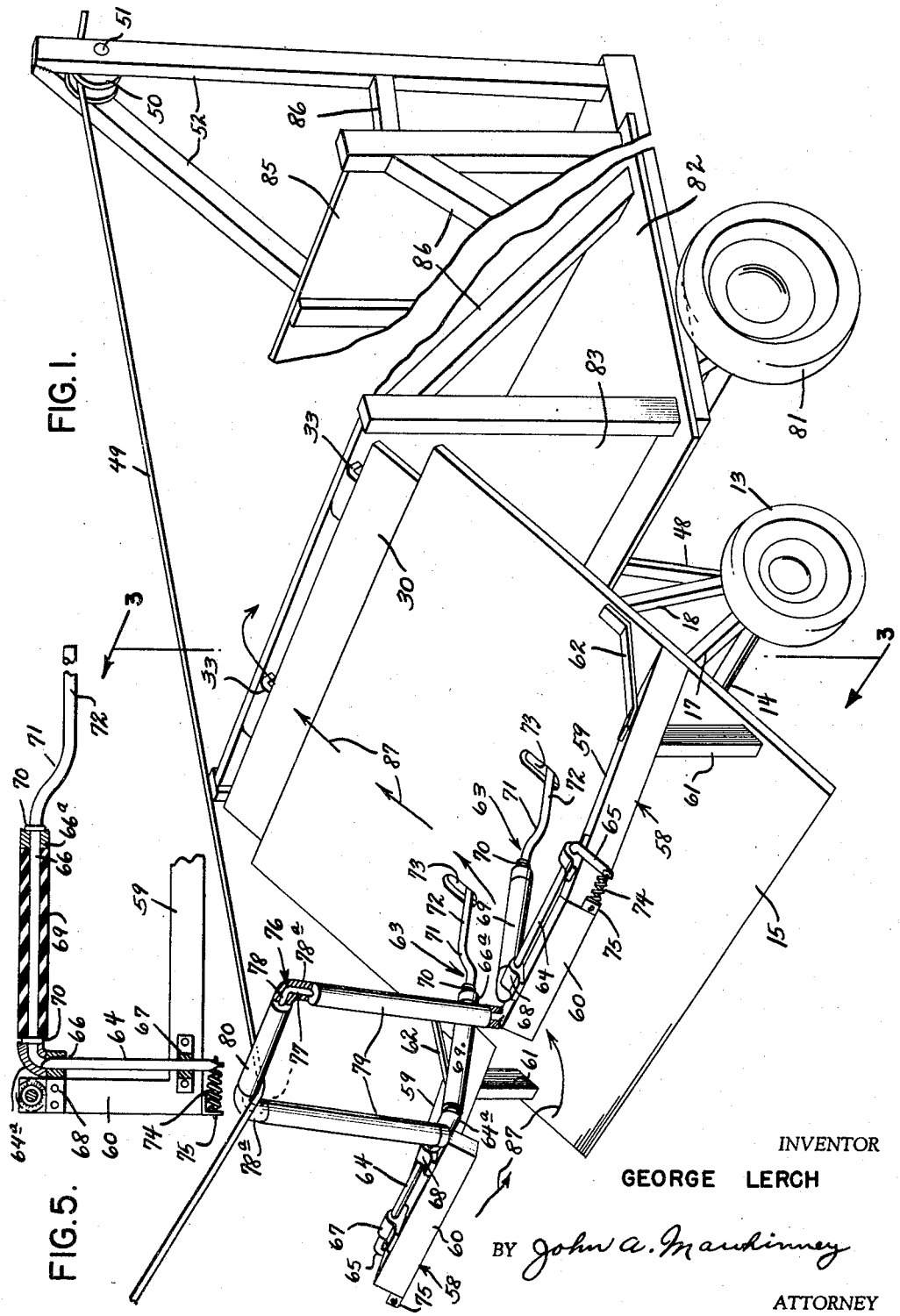
INVENTOR
GEORGE LERCH
BY John A. Mackinney
ATTORNEY

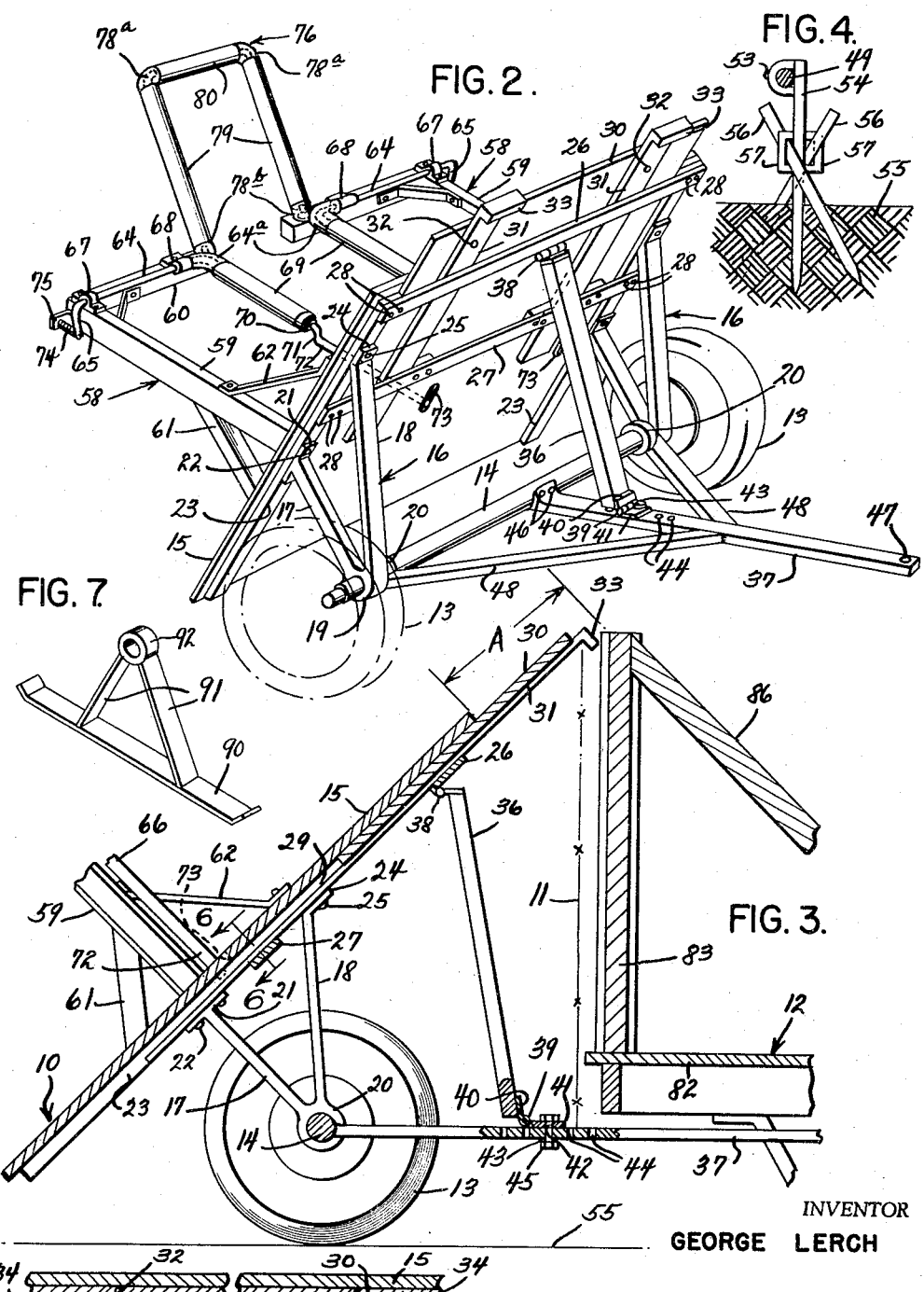

United States Patent Office 2,710,697
Patented June 14, 1955

2,710,697
HAY LOADER

George Lerch, Helena, Mont.

Application September 2, 1953, Serial No. 378,027

5 Claims. (Cl. 214—41)

The present invention relates to improvements in a hay loader and has for an object to provide a device of this kind which can be moved from haystack to haystack by one man, either over dry ground or over snow covered ground. For this purpose the device is provided with selectively interchangeable ground wheels and snow runners.

Another object of the present invention is to provide a hay loader which can be positioned within the enclosure which contains the haystack and will deliver the hay from the stacks to a wagon or the like that is located outside the enclosure so that no gates need be opened.

A further object of the present invention is to provide a device of this character in which guide means are provided for maintaining the hay fork and its cable in proper position.

A still further object of the invention is to provide an improved structure of this type in which the loading platform of the loader may be adjusted angularly and longitudinally to accommodate the hay loader to wagon backs of varying dimensions and to fences of different heights.

Still another object of the present invention is to provide a hay loader in which means are provided for holding the hay on the hay fork as it is pulled up the inclined platform of the loader.

With the foregoing and other objects in view, the invention will be hereinafter more fully described and more particularly pointed out in the appended claims.

In the drawings, in which the same parts are denoted by the same reference numerals throughout the several views, Figure 1 is a front perspective view of the improved device constructed in accordance with the present invention and illustrated in position to deposit hay upon a wagon, Figure 2 is a rear perspective view of the improved hay loader alone, Figure 3 is a sectional view taken on the line 3—3 of Figure 1, Figure 4 is a front elevational view of the anchor stake and pulley ring, Figure 5 is a top plan view of one of the hay fork guides, Figure 6 is a sectional view taken on the line 6—6 of Figure 3 with the panel in its down position, and Figure 7 is a perspective view of one of the snow runners.

Referring more particularly to the drawings, 10 generally indicates the improved hay loader for loading hay across a fence 11 upon a wagon 12, or the like. The hay loader 10 is supported by a pair of ground wheels 13 which are rotatably mounted on an axle 14. A loading platform 15 is pivotally mounted on the axle 14 by a pair of brackets 16 each which is substantially V-shaped and comprises two upwardly diverging arms 17 and 18, the lower ends of which are secured to a hub or bearing 19. Each hub 19 is rotatably received by the axle 14 and its inner face abuts a stop 20 which may be in the form of a collar fixed to the axle adjacent the end thereof. The outer face of the hub 19 engages the inner face of its adjacent wheel 13 so that each bracket 16 is restrained against longitudinal movement along the axle 14 by its collar 20 and wheel 13.

The arm 17 of each bracket 16 is disposed forwardly of the arm 18 and its upper end portion is formed into a T-shaped head 21 which is secured by screws 22 or the like to the rear face of a side strip 23. The strips 23 are attached in any suitable manner to the rear face of the platform 15 adjacent the side edges thereof and extend throughout substantially the entire height of the platform. The upper end portion of each rear arm 18 is bent rearwardly at an angle of the order of forty-five degrees to form an attaching foot 24 which is secured to the rear face of the strip 23 by screws 25 or the like. The heads 21 of the brackets 16 may be secured to the strips 23 intermediate the ends of the strips and the feet 24 may be secured between the points of attachment of the heads 21 and the upper ends of the strips 23.

An upper cross bar 26 and a lower cross bar 27 extend across the rear face of the platform 15 and are secured to the rear face of the strips 23 by screws 28 or the like. The upper bar 26 is secured to the strips 23 adjacent the upper ends thereof and the lower bar 27 is secured to the strips between the arms 17 and 18 of the brackets 16. The strips 23 and the cross bars 26 and 27 define a space 29 for the reception of an adjustable inclined section or extension panel 30. The section 30 may be of any desired height, but is illustrated as being substantially one-half the height of the platform 15 and has a width substantially the same as the distance between the inner opposed faces of the strips 23 so that the section 30 may be slid upwardly and downwardly with respect to the platform 15 but yet frictionally held in its adjusted position.

A pair of guide members or strips 31 are secured to the rear face of the section 30 by screws 32 or the like. Each guide member 31 is secured to the rear face of the panel 30 adjacent one side thereof and extends upwardly beyond the upper edge of the panel 30 and terminates in a rearwardly extending hook 33 which is adapted to engage over the top rail or top horizontal wire of the fence 11. The lower end portion of each guide member 31 extends downwardly beyond the lower edge of the panel 30 and is slidably received by the space formed by guide cleats 34 which are secured by screws 35 or the like to the forward face of the lower cross bar 27 and the portion of the lower cross bar extending between the cleats. The panel 30 is restrained against falling forwardly by the platform 15, against falling rearwardly by the cross bars 26 and 27 and against lateral movement by the strips 23 and the guide cleats 34.

In order to permit of changing the angle or inclination of the loading platform 15 and the panel 30 to accommodate them to wagons of varying dimensions, an adjustable prop or leg 36 is pivotally attached to the upper cross bar 26 and adjustably connected to the draw bar or tongue 37 of the hay loader 10. One leaf of a hinge 38 is secured to the upper end of the prop 36 and the other leaf thereof is secured to the lower edge of the upper cross bar 26. A hinge 39 has one leaf 40 secured to the rear face of the prop 36 adjacent the lower end thereof and its other leaf 41 has a hole 42 therethrough for receiving a fastening element 43, such as a screw threaded bolt or the like. The fastening element is adapted to be selectively received by the longitudinally extending row of openings 44 formed in the draw bar 37. A nut 45 is removably received by screw threaded end of the fastening element 43.

The draw bar 37 is secured at its inner end to the axle 14 by rivets 46 or the like and its outer end portion has the conventional aperture 47 for hitching it to a tractor, cart or truck for transporting the hay loader from one location to another. Diagonal braces 48 extend between and have their opposite ends secured to the draw bar 37 and the collars 20.

The forward end of a hay fork operating cable 49 is adapted to be attached to a conventional type hay fork, not shown, and the cable extends rearwardly over a guide and supporting pulley 50 which is rotatably mounted on a pivot element 51 carried by standards 52 mounted on the front end of the wagon 12. The cable extends rearwardly from the pulley 50 and passes through a pulley ring 53 mounted on the upper end of an anchor stake 54 embedded in the ground 55. Anchor pins 56 extend through U-shaped loops 57 secured to opposed sides of the stake 54 and are embedded in the ground. The pins 56 are disposed in crossed relation to one another and lie on opposite sides of the stake 54 and their lower embedded end portions are in divergent relation to one another and to the stake.

For guiding the cable 49 and the hay fork during their movements from the haystack to their dumping position upon the wagon 12, the following described guide means is provided. A pair of substantially L-shaped supporting members 58, one of which is mounted adjacent each side edge of the platform 15 and on the upper or forward face thereof. Each member 58 comprises a long leg 59 and a short leg 60. The long leg 58 has its lower end secured to the platform 15 in any suitable manner and extends upwardly and forwardly therefrom at substantially right angles thereto. A supporting post 61 is secured to the platform 15 and to the leg 59 and a strap brace 62 is also secured to the platform and leg 59 to increase its rigidity.

Each short leg 60 extends inwardly from the upper free end of its long leg 59 and the inner free ends of the short legs terminate short of each other to afford a space therebetween. A substantially L-shaped guide supporting member 63 is carried by each member 58 and comprises a crank 64 having a handle 65 and an arm 66. The crank 64 is rotatably mounted in a strap bearing 67 carried by the legs 59 and 60 and a bearing 68 carried by the leg 60. The arm 66 extends rearwardly from the inner end of the crank 64 in a substantially straight line to form a straight portion which rotatably receives a guide roller 69. The roller is restrained against undue longitudinal movement on the arm 66 by washers 70 which are fixed to the arm at opposite ends of the roller. Intermediate its ends each arm is bent laterally outwardly as at 71 and terminates in a substantially laterally outwardly offset straight end portion 72 which is normally received by an elongated slot 73 formed in the medial portion of the platform 15. A coil spring 74 has one end secured to the handle 65 of the member 63 and its opposite end engaged in a suitable opening in a bracket 75 which may be of angle iron formation and is attached to the outer end of the short leg 60.

A substantially inverted U-shaped frame 76 has the lower end portions of its legs 77 secured as by welding or the like to the upper faces of the inner end portions of the short legs 60 of the members 58. The upper ends of the legs 77 are joined by a cross piece 78. Guide rollers 79 are rotatably mounted on the legs 77 and a guide roller 80 is rotatably mounted on the cross piece 78.

The wagon 12 has four supporting wheels 81, only one of which is shown, a floor 82, a back 83 and a front 85. The front and back of the wagon are supported by braces 86.

In order to prevent the cable 49 from becoming lodged between the adjacent ends of the rollers 79 and 80, housings 78$a$ are mounted on the upper ends of the legs 77 and the opposite ends of the cross piece 78. These housings may be in the form of hollow elbows. Housings 78$b$ which may be in the form of collars are mounted on the lower ends of the legs 77 to prevent the cable from becoming jammed between the lower ends of the rollers 79 and the upper faces of the short legs 60 of the supporting members 58. Housings 64$a$ in the form of hollow elbows are mounted on the curved portions of the arms 66 to prevent the cable 49 from becoming wedged between the arms 66 and the legs 60. Between the collar 70 and the adjacent end of the roller 69 on each of the arms 66 there is disposed a housing 66$a$ which will prevent the cable 49 from becoming lodged between the collar 70 and the adjacent end of the roller 69.

When it is desired to use the hay loader on snow covered ground the wheels 13 may be removed from the ends of the axle 14 and a pair of snow runners, one of which is illustrated in Figure 7 of the drawings, may be mounted on the opposite ends of the axle. Each snow runner comprises a blade 90 to which is attached, as by welding or the like, the lower end portions of upwardly converging arms 91. The upper ends of the arms 91 support a hub or bearing 92 and are secured thereto by welding or the like. Each end portion of the axle 14 extends through its hub 92 and each snow runner may be secured to its end of the axle by any conventional means, such as screw threading the projecting end portion of the axle and threading a nut thereon outwardly of the hub 92.

In the use of the device, the hay loader will be positioned against the fence 11, as illustrated in Figures 1 and 3 of the drawings, and adjacent to a haystack. The wagon 12 will be backed up to the fence 11 on the opposite side to that on which the hay loader 10 is positioned and the extension panel 30 will be slid in or out with respect to the platform 15 until the hooks 33 are disposed above the upper rail or the upper horizontal wire of the fence 11.

The prop 36 will then be moved until the adjustment of the inclined platform 15 and panel 30 closes the space indicated by the letter A of Figure 3 of the drawings. The hooks 33 will now engage the upper edge of the fence 11 and the hole 42 in the leaf 41 of the hinge 39 will be in alignment with one of the openings 44 of the row in the draw bar 37. The fastening element 43 will then be passed through the aligned apertures and the nut 45 will then be threaded home on the fastening element 43 to hold the platform 15 and the panel 30 in their adjusted positions. With this arrangement, variations in the dimensions, including the height of the backs of different wagons, can be compensated for.

Assuming that the rear end of the cable 49 is attached to a tractor or horses, the operator will insert the hay fork into the haystack so that the hay fork will receive and retain thereon a load of hay. The tractor or horses will be driven so that through the cable 49 the hay fork will be moved towards the inclined platform 15.

At this time the cable 49 will be guided by the rollers 79 and 80 so as to prevent undue lateral movement of the cable and the hay fork. When the hay fork contacts the lowermost portion of the platform 15, the cable will be confined between the rollers 69 and the intermediate portion of the cable 49 will be supported by the upper portion of the back 83 of the wagon. The cable and the hay fork will move in the direction indicated by the arrows 87, shown in Figure 1 of the drawings.

When the loaded hay fork contacts the rollers 69, the arms 66 will be swung upwardly against the tension of the springs 74. Under the influence of the springs 74 the rollers 69 and the bent portions 71 and the straight portions 72 of the arms 66 will maintain the under surface of the hay fork in contact with the upper surface of the platform 15 and will assist in keeping the hay from straggling off the hay fork.

The tractor or horses will continue to be driven until the hay fork has reached the forward portion of the wagon 12, at which time the operator will release the hay from the hay fork. During the movement of the cable and the hay fork to the unloading position, the cable will be guided by the pulley ring 53 so that the maximum of the pulling force of the tractor or the horses will be taken advantage of.

After the fork has been emptied, the tractor or horses will be backed up and the empty hay fork will be moved by the operator down the inclined panel 30 and platform 15 between the arms 66 which have now returned to their normal positions under the influence of the springs 74, as shown in Figure 1 of the drawings.

During these loading and unloading movements, the cable 49 is at all times confined between the rollers 79 and 80 or 69 and the portions 71 and 72 of the arms 66. It will be noted that the extreme free end portions of the arms 66 will be received by the slots 73 of the platform 15 so that the cable 49 cannot escape from between the arms 66 and the cross piece 78 and the roller 80 will prevent the escape of the cable 49 when the cable is in its raised position.

When the horses are being used to move the cable and the hay fork, it is very desirable to use the stake 54 and the pulley ring 53 for properly positioning the cable 49 to obtain the maximum amount of pulling power of which the horses are capable. It is not necessary to use the pulley ring 53 when a tractor is employed as the pulling power, but it may be desirable to do so.

It is obvious that various changes and modifications may be made in the details of construction and design of the above specifically described embodiment of this invention without departing from the spirit thereof, such changes and modifications being restricted only by the scope of the following claims.

What I claim is:

1. A hay loader for moving hay from one side of a fence on to a wagon disposed on the opposite side of said fence comprising a mobile frame, a platform pivotally supported by said mobile frame, an adjustable panel, means for supporting said panel so that it can be moved towards and from said platform so as to decrease and increase the effective supporting area of said platform and maintaining said panel in its adjusted position, and means for adjusting the inclination of said platform and panel with respect to the fence and the back of the wagon to accommodate the platform and panel to wagons of varying dimensions, a cable adapted to be connected at one end thereof to a hay fork and at the opposite end to a source of pulling power, guide means for said cable comprising a pair of substantially L-shaped supporting members on said platform, a plurality of rollers supported by said L-shaped supporting members and arranged in a substantially inverted U-shaped formation, a guide supporting member rotatably mounted on each L-shaped member and having a free end portion, said platform having slots therein for receiving the free end portions of said guide supporting members, a roller mounted on each of said guide supporting members, and resilient means on each of said guide supporting members and connected thereto for urging said guide supporting members towards said platform and causing the free end portion of each guide supporting member to be received by its slot.

2. A hay loader as claimed in claim 1 wherein an anchor stake is adapted to be driven into the ground between said hay loader and said source of pulling power, a pulley ring is carried by said anchor stake for receiving and guiding said cable, and anchor pins engage said anchor stake and are adapted to be driven into the ground.

3. A hay loader as claimed in claim 1 wherein rotatable means are carried by said wagon for supporting intermediate portions of said cable.

4. A hay loader as claimed in claim 1 wherein a housing is disposed between the adjacent ends of the rollers which comprise the U-shaped formation, a housing is positioned adjacent the lower end of each of the vertically disposed rollers of the U-shaped formation, and a housing is carried by each of said guide supporting members adjacent the opposite ends of the roller mounted on each of said guide supporting members.

5. A hay loader comprising an inclined platform, means for supporting said platform, and guide means for a hay fork cable comprising a plurality of guide rollers arranged in substantially inverted U-shape and supported by said platform, a pair of spaced apart opposed rollers positioned between said U-shaped arranged rollers and said platform for confining the hay fork cable within said rollers, said platform being provided with slots, a pair of substantially L-shaped members upon which said spaced rollers are mounted and each having a free end portion adapted to be received by one of said slots, means pivotally supporting each of said L-shaped members upon said platform, and resilient means normally pivoting each of said L-shaped members in a direction so that its free end portion is received by its slot.

References Cited in the file of this patent

UNITED STATES PATENTS

| | | |
|---|---|---|
| 152,707 | Tompkins | June 30, 1874 |
| 495,831 | Palmer | Apr. 18, 1893 |
| 510,055 | Stodder et al. | Dec. 5, 1893 |
| 512,988 | McTurner et al. | Jan. 16, 1894 |
| 680,979 | Jacobs | Aug. 20, 1901 |
| 795,859 | Ring | Aug. 1, 1905 |
| 1,033,814 | Lucas et al. | July 30, 1912 |
| 1,106,074 | Bidlake | Aug. 4, 1914 |
| 1,189,678 | Fihn | July 4, 1916 |
| 1,987,688 | Lamb | Jan. 15, 1935 |

FOREIGN PATENTS

| | | |
|---|---|---|
| 46,141 | Sweden | Sept. 28, 1916 |
| 112,462 | Australia | Feb. 3, 1941 |